United States Patent
Ebbesen et al.

(10) Patent No.: US 10,428,794 B2
(45) Date of Patent: Oct. 1, 2019

(54) PITCH SYSTEM LOCKING ARRANGEMENT

(71) Applicant: Siemens Gamesa Renewable Energy A/S, Brande (DK)

(72) Inventors: Henning Ebbesen, Skjern (DK); Christian Laursen, Hedensted (DK)

(73) Assignee: Siemens Gamesa Renewable Energy A/S (DK)

( * ) Notice: Subject to any disclaimer, the term of this patent is extended or adjusted under 35 U.S.C. 154(b) by 457 days.

(21) Appl. No.: 15/152,623

(22) Filed: May 12, 2016

(65) Prior Publication Data
US 2016/0348647 A1 Dec. 1, 2016

(30) Foreign Application Priority Data
May 27, 2015 (EP) .................................... 15169430

(51) Int. Cl.
*F03D 7/02* (2006.01)
*F03D 80/70* (2016.01)
(Continued)

(52) U.S. Cl.
CPC ......... *F03D 7/0224* (2013.01); *F03D 1/0658* (2013.01); *F03D 7/0244* (2013.01);
(Continued)

(58) Field of Classification Search
CPC .... F16B 1/02; F16B 1/04; F16D 71/04; E05B 15/0046; E05B 2015/0066; G05G 5/08; G05G 5/18
(Continued)

(56) References Cited

U.S. PATENT DOCUMENTS

| 4,827,248 A | * | 5/1989 | Crudden | ................ B64D 29/00 244/110 B |
| 5,746,298 A | * | 5/1998 | Krivec | .................... B25B 15/02 192/48.3 |

(Continued)

FOREIGN PATENT DOCUMENTS

| CN | 101994646 A | 3/2011 |
| CN | 102209846 A | 10/2011 |

(Continued)

OTHER PUBLICATIONS

Chinese language Office Action for CN application No. 201610359363.3, dated May 3, 2018.
(Continued)

*Primary Examiner* — Mary E McManmon
*Assistant Examiner* — Richard K. Durden
(74) *Attorney, Agent, or Firm* — Schmeiser, Olsen & Watts LLP

(57) ABSTRACT

A rotor of a wind turbine is disclosed with a pitch system locking arrangement to lock the position of a wind turbine rotor blade. A rotor comprises a rotor hub and a rotor blade, whereby the rotor blade is connected to the hub via a bearing, to be rotatable in respect to the hub in a pitch movement. The rotor blade comprises a root section, and the root section comprises a plate, that at least partially covers the cross section of the rotor blade. A certain predetermined rotational position of the rotor blade with respect to the hub is a locked position. The hub includes a locking pawl. The plate comprises an opening, and the locking pawl is at least partially located in the opening of the plate, when the rotor blade is in the locked position.

15 Claims, 4 Drawing Sheets

(51) Int. Cl.
*F03D 1/06* (2006.01)
*F16B 1/04* (2006.01)
*F16D 71/04* (2006.01)
*G05G 5/18* (2006.01)

(52) U.S. Cl.
CPC .......... *F03D 80/70* (2016.05); *F05B 2260/30* (2013.01); *F05B 2260/406* (2013.01); *F16B 1/04* (2013.01); *F16D 71/04* (2013.01); *G05G 5/18* (2013.01); *Y02E 10/721* (2013.01); *Y02E 10/723* (2013.01)

(58) Field of Classification Search
USPC .................................................. 416/153, 154
See application file for complete search history.

(56) References Cited

U.S. PATENT DOCUMENTS

| 2007/0187954 | A1* | 8/2007 | Struve .................. F03D 7/0244 290/44 |
| 2010/0119373 | A1 | 5/2010 | Vronsky et al. |
| 2011/0044813 | A1 | 2/2011 | Lindberg et al. |
| 2011/0142620 | A1 | 6/2011 | Loh et al. |
| 2011/0206509 | A1 | 8/2011 | Benito Santiago et al. |
| 2012/0266708 | A1 | 10/2012 | Valero Lafuente |
| 2013/0076040 | A1* | 3/2013 | Tsutsumi .................. F03D 9/28 290/54 |
| 2013/0259688 | A1 | 10/2013 | Sorensen |
| 2015/0219073 | A1* | 8/2015 | Baumgaertel ........... F03D 80/50 416/1 |
| 2016/0312766 | A1* | 10/2016 | Rasmussen ........... F03D 7/0224 |
| 2016/0363098 | A1* | 12/2016 | Kopecek ................. F02K 1/766 |

FOREIGN PATENT DOCUMENTS

| CN | 102374124 A | 3/2012 |
| CN | 102536629 A | 7/2012 |
| CN | 102725521 A | 10/2012 |
| CN | 103362739 A | 10/2013 |
| DE | 102004017323 A1 | 11/2005 |
| EP | 2290228 A2 | 3/2011 |

OTHER PUBLICATIONS

European Search Report for Aplication No. 15169430.4, dated Nov. 19, 2015.

* cited by examiner

Prior Art

PITCH SYSTEM LOCKING ARRANGEMENT

CROSS-REFERENCE TO RELATED APPLICATIONS

This application claims priority to European application No. EP 15169430.4 having a filing date of May 27, 2015 the entire contents of which are hereby incorporated by reference.

FIELD OF TECHNOLOGY

The following relates to a pitch system locking arrangement.

BACKGROUND

A wind turbine comprises a rotor that is equipped with rotor blades. The rotor converts the energy of the moving air into rotational energy of the rotor that is then transformed into electrical energy in the generator of the wind turbine.

The rotor blades are connected to the hub of the rotor in a way that they can be rotated around their longitudinal axis. Thus the rotor blades can perform a pitch movement relative to the hub.

The pitch movement is needed to control the rotational speed of the rotor and the performance of the wind turbine.

When the wind turbine is not in operation, the rotor blades are arrested in a stop position.

In an emergency situation the rotor of a wind turbine needs to be stopped in a short time. To quickly stop the rotation of the rotor, the rotor blades are pitched into a stop position. In this stop position the aerodynamic shape of the rotor blades is no longer used to support the rotation of the rotor. In addition the rotor blades interact with the surrounding air in a way that the rotational speed of the rotor is decreased.

An emergency situation in a wind turbine might occur due to the loss of the grid connection or a technical problem like the loss of a viable technical system.

In an emergency situation the rotor blades are locked in the stop position. The rotor blades are locked mechanically in a way that no further energy is needed to maintain the rotor blades in the locked position.

The locking mechanism of a rotor blade comprises a click-stop device, to allow the rotor blade to enter the locking position, but not to leave the locking position in at least one direction.

It is known to build a locking mechanism with a pawl, a ramp, and a notch. The pawl slides along the ramp to enter the notch. Once the pawl arrests in the notch the position of the rotor blade is locked.

The parts are mounted to a base, for example to a reinforcement plate of the blade bearing.

This shows the disadvantage, that several parts need to be mounted in the wind turbine, and that the parts need to be controlled and maintained during service to ensure their proper function.

In addition bending moments are introduced into the plate, as the parts comprise a lever when the locking pawl is acting on the parts building the ramp and providing the notch. Thus the reinforcement plate needs to be built rigid enough to withstand the bending moments introduced into the plate.

The aim of embodiments of the invention is therefore to provide an improved arrangement of a locking mechanism.

SUMMARY

A rotor of a wind turbine is disclosed with a pitch system locking arrangement to lock the position of a wind turbine rotor blade. A rotor comprises a rotor hub and a rotor blade, whereby the rotor blade is connected to the hub via a bearing, to be rotatable in respect to the hub in a pitch movement.

The rotor blade comprises a root section, and the root section comprises a plate, that at least partially covers the cross section of the rotor blade. A certain predetermined rotational position of the rotor blade in respect to the hub is a locked position. The hub comprises a locking pawl.

The plate comprises an opening and the locking pawl is at least partially located in the opening of the plate, when the rotor blade is in the locked position.

The root section of the rotor blade is the area of the blade that is closest to the hub. Thus the rotor blade is connected to the hub at the end of its root section.

The root section of the rotor blade is directly connected to the bearing that allows the rotor blade to be pitched in respect to the hub, and the bearing is attached to the hub.

A locked position is a position where the pitch movement of the rotor blade can be locked or prevented in at least one direction of the pitch movement. In the locked position the locking pawl is aligned with the opening in the plate in a way that the locking pawl can be moved into the opening. Thus the locking pawl hinders a further movement of the plate and thus the rotor blade in respect to the hub as long as the locking pawl is present in the opening.

When the wind turbine rotor blade is pitched into a locked position, the locking pawl is present in the opening in the plate of the root section. When a further pitch movement of the rotor blade occurs, the plate of the rotor blade would start to move in respect to the hub and the locking pawl. The rim of the opening of the plate abuts on the surface of the locking pawl. The locking pawl is fixed in respect to the hub, thus the locking pawl prevents a further pitch movement of the rotor blade.

When the plate abuts on the surface of the locking pawl, forces are introduced in the plate. These forces are directly introduced in the side wall of the opening in the plate, and thus in the plane defined by the plate. Thus no bending moments occur in the plate. Thus the plate can be constructed with less material.

In addition no parts are attached to the plate, that need to transfer forces from the locking pawl into the plate.

Thus material and installation time is saved.

A rotor of a wind turbine is disclosed with a pitch system locking arrangement to lock the position of a wind turbine rotor blade. A rotor comprises a rotor hub and a rotor blade, whereby the rotor blade is connected to the hub via a bearing, to be rotatable in respect to the hub in a pitch movement. The rotor blade comprises a root section, and the root section comprises a plate, that at least partially covers the cross section of the rotor blade. The hub comprises a locking pawl. The plate comprises an opening. The locking pawl interacts with the opening in a way that the locking pawl is introduced in the opening to lock the position of the rotor blade in respect to the hub.

In a preferred embodiment the root section is a reinforcement plate, to reinforce the bearing.

Thus no additional plate or element is needed to lock the position of the rotor blade by the locking pawl.

The locking pawl comprises a longitudinal axis that is arranged mainly vertical to the plate, and that the locking pawl is movable along the longitudinal axis, to be moved into and be retracted from the opening in the plate.

Thus the locking pawl can be moved into the opening and out of the opening in the plate to lock and release the position of the rotor blade.

The locking pawl comprises a spring, to push the locking pawl in the direction of the plate along its longitudinal axis.

Thus the locking pawl is pushed in the direction of the plate and will be pushed into the opening once the opening is in the respective position for the locking pawl to enter the opening. Thus the position of the rotor blade will be arrested when the locked position is reached. This happens passively by using the spring force, no actively controlled movement of the locking pawl is necessary. Thus the locking pawl will also arrest the position of the rotor blade in an emergency situation.

The locking pawl comprises an actuator to move the locking pawl along its longitudinal axis.

Thus the locking pawl can be moved in an actively controlled manner. The locking pawl can be retracted from the opening, for example, to release the rotor blade from the locked position.

The actuator is a hydraulic actuator.

In the case that the pitch drive unit to rotate the rotor blade is an hydraulic unit, a hydraulic system is already available in the hub. Thus no further type of system is needed in the hub of the wind turbine.

The locking pawl comprises a lock, to arrest the position of the locking pawl in the opening in the plate.

The lock of the locking pawl is a mechanical arrangement, as known to the one skilled in the art, to arrest the position of the locking pawl. This prevents any movement of the locking pawl along its longitudinal axis.

Thus the locking pawl will stay in the opening of the plate, and the rotor blade will stay in the locked position. This is relevant for safety of personnel and the wind turbine in during service and maintenance.

The plate comprises a plurality of openings to achieve a plurality of locked positions of the rotor blade.

For the safe operation of the wind turbine several positions of the rotor blade are relevant, where it must be possible to limit the movement, or prevent a further movement of the rotor blade.

At least one opening in the plate is closed by a cover, whereby the cover is displaced in a direction vertical to the plate, to allow the locking pawl to be present in the opening of the plate.

Thus the plate is closed in a liquid tight manner, while the locking pawl can still be present in the opening of the plate.

Thus any distribution of, for example, hydraulic fluid into the rotor blades is prevented.

The cover comprises a ramp for the locking pawl to slide along, so that the locking pawl can slide out of the opening in one rotational direction of the rotor blade in respect to the hub.

Thus the locking pawl will enter the opening when the opening is aligned to the locking pawl during a pitch rotation, whereby the locking pawl can enter the opening from any direction.

The locking pawl can slide out of the opening when the rotor blade is pitched into one predetermined direction, but will prevent a further movement of the rotor blade in the other direction.

The plate comprises at least two openings, whereby one opening comprises a cover with a ramp.

Thus the plate is prepared to allow for at least two locked position necessary for a safe operation of the wind turbine.

One of the positions is a locked position, where the locking pawl can slide along the ramp and leave the opening to allow a further movement in one direction only. Thus the rotor blade can be further pitched to reach at least a second locked position.

The cover comprises a sensor to sense the presence of the locking pawl in the opening of the plate.

Thus the presence of the locking pawl in the opening can be detected. Thus it can be verified that the rotational position of the rotor blade is locked.

The sensor is an electric sensor.

Thus the sensor can be directly connected to the control system of the wind turbine.

A method to lock the pitch position of a rotor blade at a rotor is disclosed, to operate an arrangement according to embodiments of the invention.

The method comprises the steps of rotating the rotor blade in respect to the hub in pitch movement, and introducing the locking pawl into the opening in the plate of the rotor blade to lock the rotational position of the rotor blade in respect to the hub.

The method comprises the additional step of pushing the locking pawl into the opening in the plate by using the force of the spring, whereby the locking pawl comprises a spring to move the locking pawl along its longitudinal axis into the opening in the plate.

BRIEF DESCRIPTION

Some of the embodiments will be described in detail, with reference to the following figures, wherein like designations denote like members, wherein.

DETAILED DESCRIPTION

Figure 1:
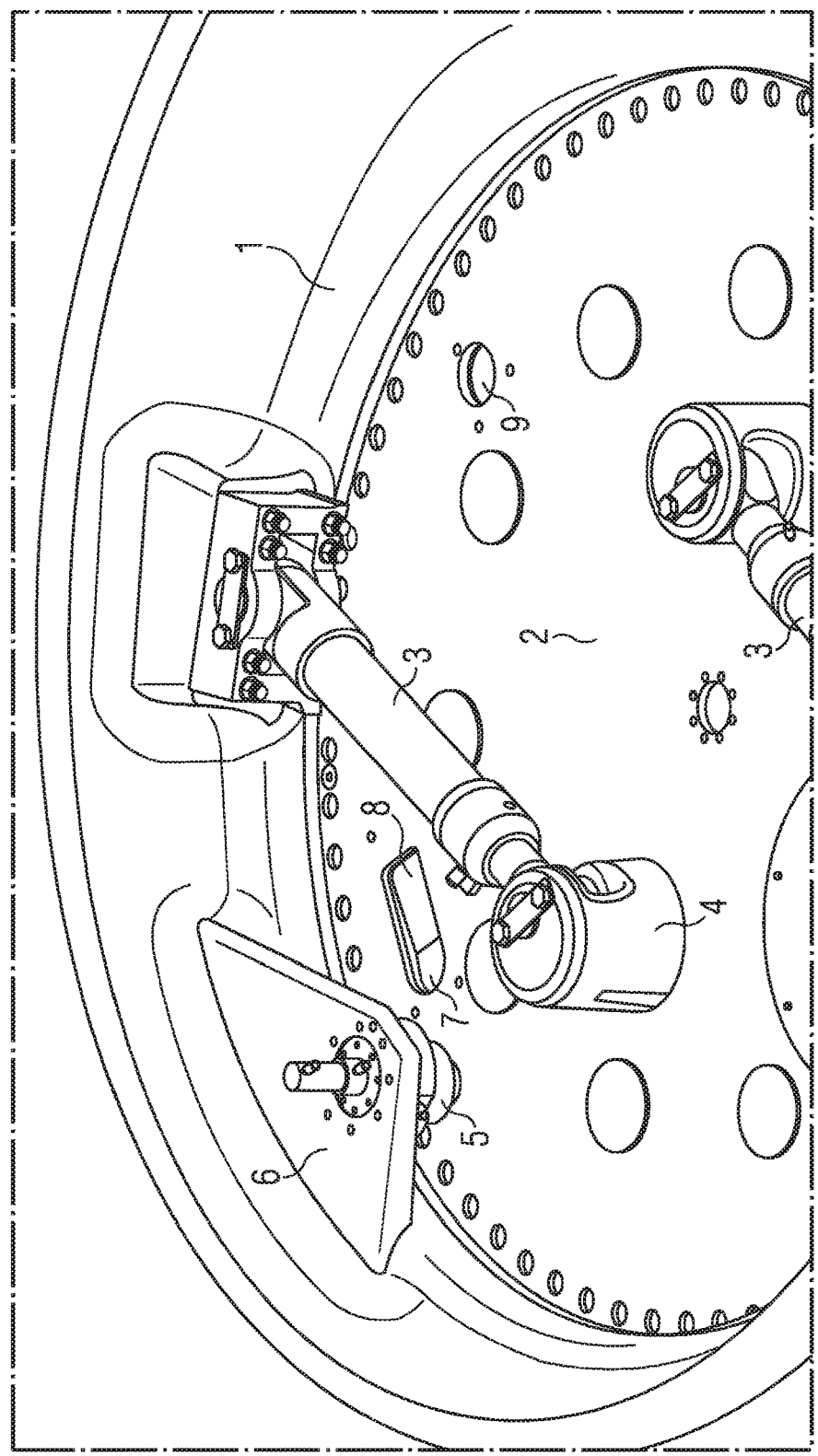
FIG. 1 shows a pitch drive of a rotor blade.

FIG. 1 shows a pitch drive system for a rotor blade. The pitch drive system comprises a hydraulic cylinder 3 that is at its one end connected to the hub 1 and at its other end connected to the reinforcement plate 2 by a connection point 4.

The reinforcement plate 2 is connected to the rotor blade and is rotatable together with the rotor blade with respect to the hub 1. When the hydraulic cylinder 3 expands, it implies a force into the connection point 4 between the hydraulic cylinder 3 and the reinforcement plate 2, and rotates the reinforcement plate 2 in respect to the hub 1.

To arrest the pitch of the rotor blade in a certain position in the case of an emergency, a locking system for the pitch has to be provided.

The locking system for the pitch comprises a pitch lock 5 that is connected to a support 6 to the hub 1 of the wind turbine. The pitch lock 5 comprises a drive and a locking pawl.

To secure a position of the rotor blade at a certain pitch angle, the locking pawl is moved into an opening in the reinforcement plate by the drive of the pitch lock system.

The reinforcement plate 2 of the pitch system comprises an opening 7, 9 to interact with the locking pawl of the pitch lock 5. The openings 7, 9 in the reinforcement plate 2 are through-going openings that allow the locking pawl of the pitch lock 5 to be at least partially moved through the reinforcement plate 2.

When the locking pawl of the pitch lock 5 is moved through the first opening 7 and/or a second opening 9 of the reinforcement plate 2, a further rotational movement of the reinforcement plate 2 in respect to the hub 1 is prevented.

The opening 7 in the reinforcement plate 2 is a longish opening that comprises a ramp 8. The locking pawl of the pitch lock 5 is spring loaded and the ramp 8 of the opening 7 allows the locking pawl to move out of the opening 7 in one direction.

The opening 9 and the reinforcement plate 2 is not equipped with a ramp, thus once the locking pawl of the pitch lock 5 is arrested in the opening 9, the locking pawl has to be actively removed from the opening 9 to allow a further rotational movement of the reinforcement plate 2 in respect to the hub 1.

Figure 2:
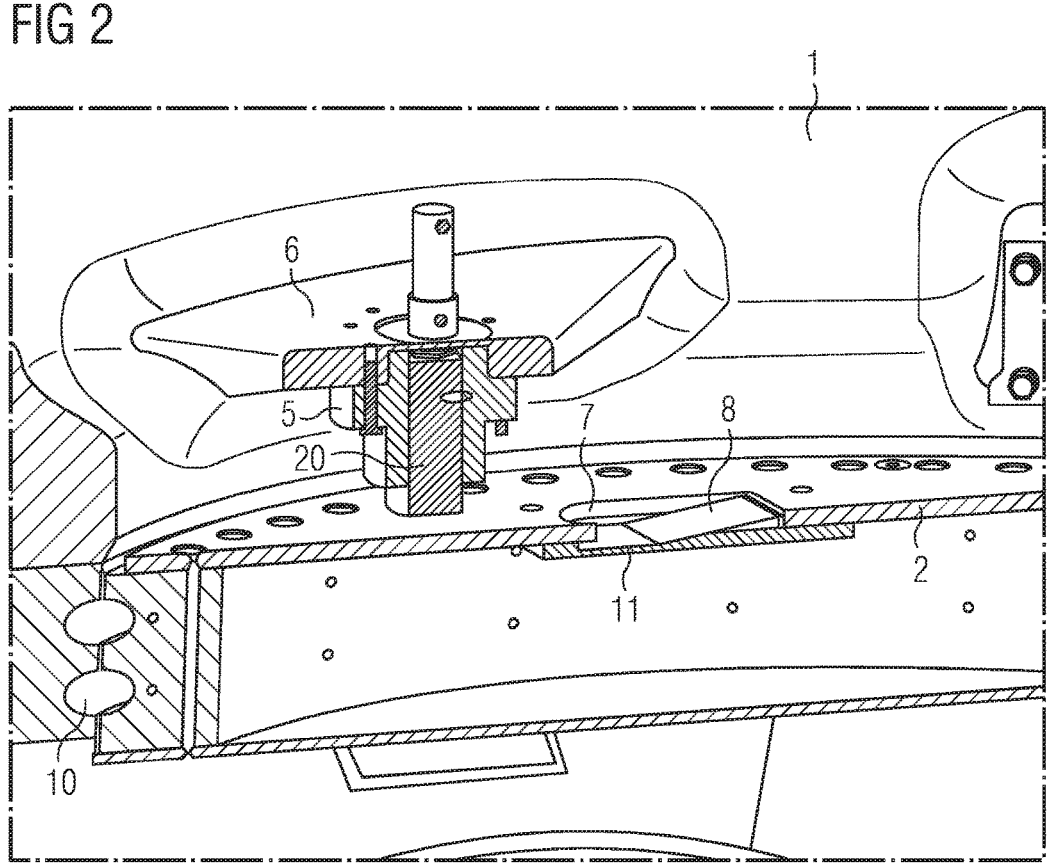
FIG. 2 shows a crosscut through the pitch lock system.

FIG. 2 shows a crosscut through the pitch lock 5, the reinforcement plate 2 and the opening 7 for the pitch lock 5.

The reinforcement plate 2 is connected to the inner ring of the pitch bearing 10 of the rotor blade. Thus, the reinforcement plate 2 is rotatable together with the rotor blade.

The outer ring of the pitch bearing 10 is connected to the hub 1 of the wind turbine. Thus, the reinforcement plate 2 is rotatable in respect to the hub 1 of the wind turbine.

To secure the rotor blade in a stop position in the case of an emergency, a further rotational movement of the reinforcement plate 2 in respect to the hub 1 is prevented by introducing the locking pawl 20 of the pitch lock 5 into the opening 7 in the reinforcement plate 2.

The pitch lock 5 is connected by a support structure 6 to the hub 1. The pitch lock 5 comprises a drive and a locking pawl 20. The drive is used to move the locking pawl 20 in the direction of its longitudinal axis into the opening 7 of the reinforcement plate 2.

The opening 7 in the reinforcement plate 2 comprises a ramp 8 to allow the locking pawl 20 of the pitch lock system to move out of the opening 7 in one direction only.

The opening 7 in the reinforcement plate 2 is covered by a cover plate 11. The cover plate 11 closes the space of the rotor blade in respect to the hub 1 to prevent oil, grease or loose objects from the hub to enter the rotor blade, or vice versa.

The cover plate 11 can be a sealed plate.

Figure 3:
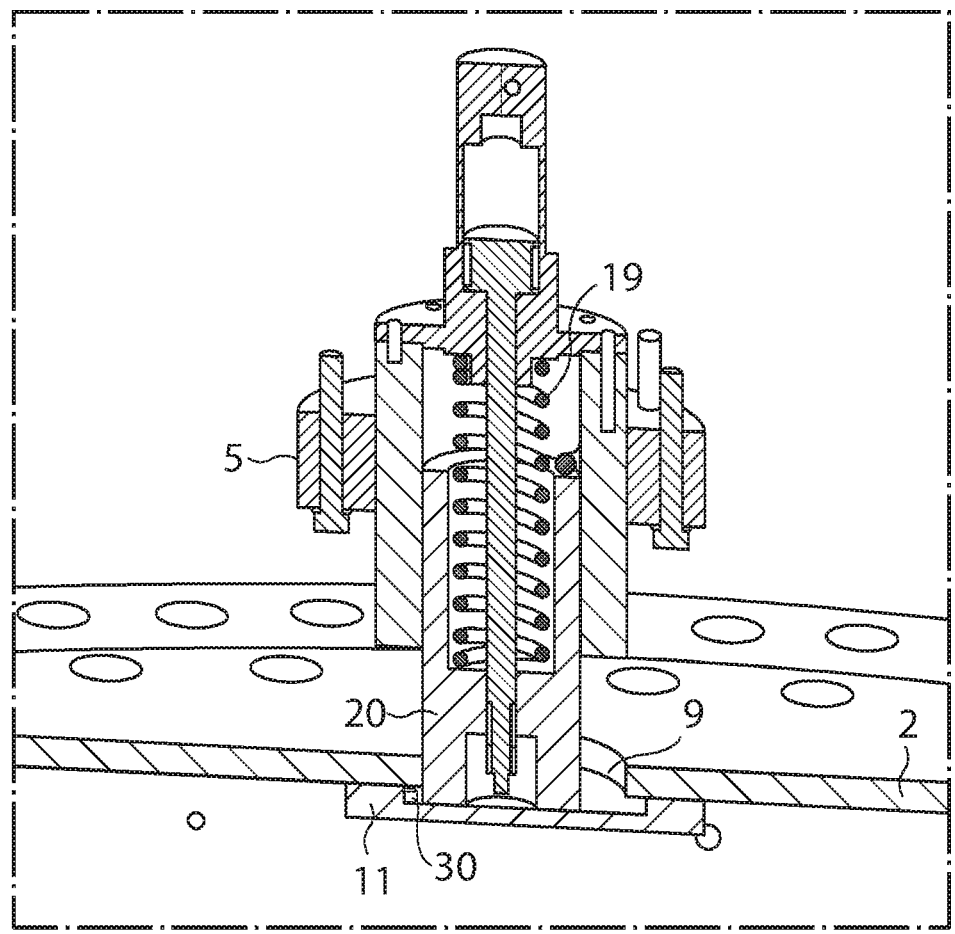
FIG. 3 shows a crosscut through the pitch lock system.

FIG. 3 shows a crosscut through the pitch lock system 5.

The pitch lock system 5 comprises a locking pawl 20 that interacts with the opening 9 in the reinforcement plate 2. The locking pawl 20 within the pitch lock system 5 is actively moved by a drive and in addition, passively moved by a spring 19.

In the case of an emergency, the spring 19 pushes the locking pawl 20 into the opening 9 to lock the pitch position of the rotor blade in a stopped position.

The locking pawl 20 of the pitch lock system interacts with the opening 9 in the reinforcement plate 2. It prevents a further rotational movement of the rotor blade by inducing a force into the reinforcement plate 2. The force is induced into the reinforcement plate 2 in the plane of the reinforcement plate 2.

Thus, no lever force is present between the locking pawl 20 of the pitch lock 5 and the reinforcement plate 2. Thus, no bending moments are induced into the reinforcement plate 2 by the pitch lock 5.

The opening 9 in the reinforcement plate 2 is covered by a cover plate 11. The cover plate 11 seals the space within the rotor blade and thus prevents the movement of spill oil, grease or loose objects from the rotor blade into the hub of the wind turbine, or vice versa. In addition, the cover plate 11 limits the movement of the locking pawl 20 of the pitch lock 5.

The cover plate 11 can also be equipped with a sensor, such as sensor 30 shown in FIG. 3, to detect that the locking pawl 20 of the pitch lock 5 is present in the opening 9 of the reinforcement plate 2. The sensor 30 may be an electric sensor.

Figure 4:
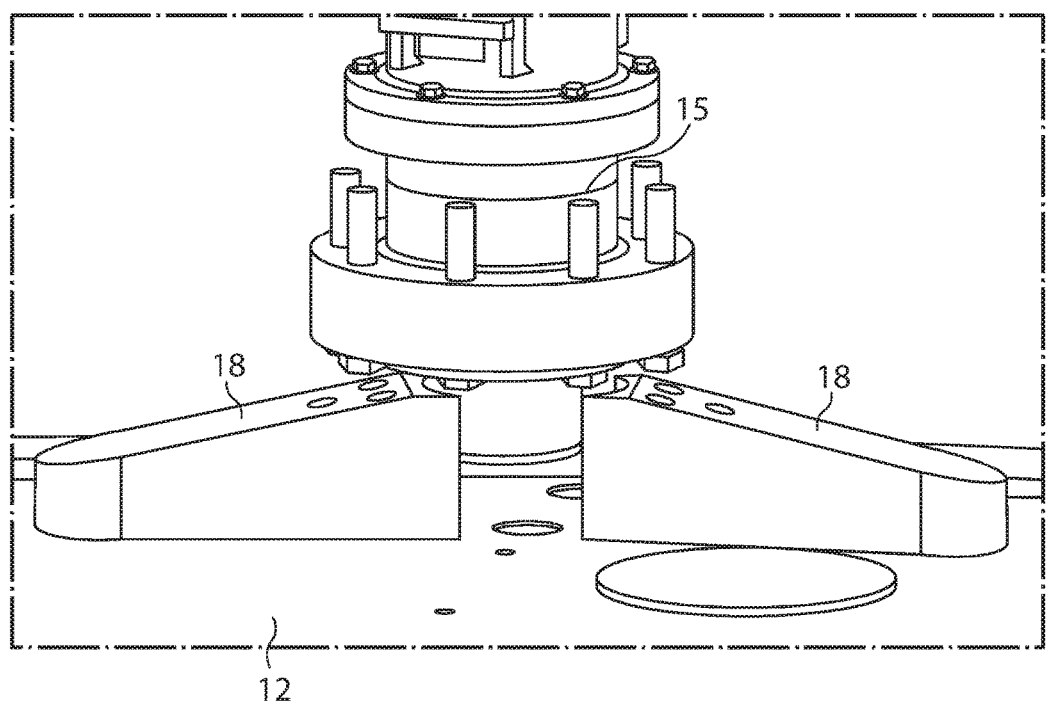
FIG. 4 shows the pitch lock of the state of the art.

FIG. 4 shows a pitch lock system of the state of the art. The pitch lock 15 interacts with two blocks 18 that are connected to the reinforcement plate 12.

In the case of an emergency, thus in the case when the angular position of the rotor blade needs to be arrested in a stop position, a locking pawl is extended from the pitch lock 15. The locking pawl is spring loaded and can move up the ramps 18 and lock itself into the gap between the blocks 18 to lock the position of the rotor blade.

The locking pawl interacts with the sides of the block 18 that are connected to the reinforcement plate 12. Thus, the force induced by the locking pawl of the pitch lock 15 into the reinforcement plate 12 is induced over a lever that is made up by the sides of the blocks 18.

The lever at the sides of the block 18 leads to a bending moment that is induced into the reinforcement plate 12. The reinforcement 12 has to be planned to be ridged enough to withstand the bending moments induced by the lever of the sides of the block 18.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A rotor of a wind turbine with a pitch system locking arrangement to lock the position of a wind turbine rotor blade, comprising: a rotor having a rotor hub and a rotor blade, wherein the rotor blade is connected to the hub via a bearing, to be rotatable with respect to the hub in a pitch movement, wherein the rotor blade includes a root section, and the root section includes a plate, that at least partially covers the cross section of the rotor blade, whereby a predetermined rotational position of the rotor blade with respect to the hub is a locked position, wherein the hub comprises a locking pawl, wherein the plate has an opening and the locking pawl is at least partially located in the opening of the plate, when the rotor blade is in the locked position, wherein the opening further comprises a ramp for the locking pawl to slide along, so that the locking pawl can slide out of the opening in one rotational direction of the rotor blade with respect to the hub, and wherein the plate directly abuts on the surface of the locking pawl such that forces from the locking pawl are applied directly to a side wall of the opening in the plate, the direction of application of the forces from the locking pawl being only in a plane defined by the plate such that the forces from the locking pawl applied to the plate do not cause any out-of-plane bending moments to occur in the plate.

2. The rotor of a wind turbine according to claim 1, wherein the plate at the root section is a reinforcement plate, to reinforce the bearing.

3. The rotor of a wind turbine according to claim 1, wherein the locking pawl further comprises a longitudinal axis that is arranged vertical with respect to the plate, and that the locking pawl is movable along the longitudinal axis, to be moved into and be retracted from the opening in the plate.

4. The rotor of a wind turbine according to claim 1, wherein the locking pawl further comprises a spring, to push the locking pawl in the direction of the plate along a longitudinal axis of the locking pawl.

5. The rotor of a wind turbine according to claim 1, wherein the locking pawl further comprises an actuator to move the locking pawl along a longitudinal axis of the locking pawl.

6. The rotor of a wind turbine according to claim 5, wherein the actuator is a hydraulic actuator.

7. The rotor of a wind turbine according to claim 1, wherein the locking pawl acts as a lock, to arrest the position of the locking pawl in the opening in the plate.

8. The rotor of a wind turbine according to claim 1, wherein the plate comprises at least a second opening to achieve a plurality of locked positions of the rotor blade.

9. The rotor of a wind turbine according to claim 1, wherein the opening in the plate is closed by a cover, whereby the cover is displaced in a direction vertical to the plate, to allow the locking pawl to be present in the opening of the plate.

10. The rotor of a wind turbine according to claim 9, wherein the cover further comprises the ramp for the locking pawl to slide along.

11. The rotor of a wind turbine according to claim 10, wherein the opening in the plate is a first opening; wherein the plate further comprises at least a second opening, and wherein only the first opening comprises the cover with the ramp.

12. The rotor of a wind turbine according to claim 11, wherein the cover further comprises a sensor to sense the presence of the locking pawl in the first opening of the plate.

13. The rotor of a wind turbine according to claim 12, wherein the sensor is an electric sensor.

14. A method to lock the pitch position of a rotor blade at a rotor, whereby the method comprises the steps of:
provinding a rotor having a hub;
rotating the rotor blade with respect to the hub in pitch movement;
providing a locking pawl and a plate having an opening;
introducing the locking pawl into the opening in the plate of the rotor blade to lock the rotational position of the rotor blade with respect to the hub such that the locking pawl applies forces to a side wall of the plate only in a direction along a plane defined by the plate such that the forces from the locking pawl applied to the plate do not cause any out-of-plane bending moments to occur in the plate; and
providing a ramp in the opening for the locking pawl to slide along, so that the locking pawl can slide out of the opening in one rotational direction of the rotor blade with respect to the hub.

15. The method to lock the pitch position of a rotor blade at a rotor according claim 14, whereby the locking pawl comprises a spring to move the locking pawl along its longitudinal axis into the opening in the plate, and the method comprises the additional step of: pushing the locking pawl into the opening in the plate by using the force of the spring.

* * * * *